United States Patent
Gessler et al.

(10) Patent No.: US 7,942,993 B2
(45) Date of Patent: May 17, 2011

(54) METHOD FOR PRODUCING MULTILAYER TAILORED FIBER PLACEMENT (TFP) PREFORMS USING MELTABLE FIXING FIBERS

(75) Inventors: Andreas Gessler, Haar (DE); Juergen Filsinger, Aying (DE)

(73) Assignee: EADS Deutschland GmbH, Ottobrunn (DE)

( * ) Notice: Subject to any disclaimer, the term of this patent is extended or adjusted under 35 U.S.C. 154(b) by 2134 days.

(21) Appl. No.: 10/450,187

(22) PCT Filed: Dec. 10, 2001

(86) PCT No.: PCT/EP01/14442
§ 371 (c)(1),
(2), (4) Date: Nov. 7, 2003

(87) PCT Pub. No.: WO02/45932
PCT Pub. Date: Jun. 13, 2002

(65) Prior Publication Data
US 2004/0074589 A1    Apr. 22, 2004

(30) Foreign Application Priority Data
Dec. 8, 2000  (DE) .................................. 100 61 028

(51) Int. Cl.
*B32B 37/00* (2006.01)
(52) U.S. Cl. ...... 156/148; 156/155; 156/247; 156/308.2
(58) Field of Classification Search .................. 156/148, 156/308.2, 155, 305, 247, 245
See application file for complete search history.

(56) References Cited

U.S. PATENT DOCUMENTS

| | | | | |
|---|---|---|---|---|
| 4,410,385 A * | 10/1983 | Murphy et al. | ............... | 156/181 |
| 4,867,086 A * | 9/1989 | Vees et al. | ................ | 112/475.04 |
| 4,913,937 A * | 4/1990 | Engdahl et al. | ............... | 427/314 |
| 5,228,175 A * | 7/1993 | Olry et al. | ........................ | 28/168 |
| 5,577,307 A * | 11/1996 | Itoi | ................ | 28/168 |
| 6,105,223 A | 8/2000 | Brown et al. | | |
| 6,890,476 B2 * | 5/2005 | Wagener et al. | ............... | 264/478 |
| 2002/0162624 A1 * | 11/2002 | Ebert et al. | ..................... | 156/254 |

FOREIGN PATENT DOCUMENTS

| | | |
|---|---|---|
| DE | 43 23 761 | 1/1995 |
| DE | 196 28 388 | 1/1998 |
| DE | 100 05 202 | 11/2000 |
| EP | 0 193 478 | 9/1986 |
| EP | 0 272 083 | 6/1988 |
| EP | 0 567 845 | 11/1993 |
| EP | 1 125 728 | 8/2001 |
| FR | 1 394 271 | 4/1965 |
| FR | 2 568 575 | 2/1986 |
| WO | 00/56539 | 9/2000 |

OTHER PUBLICATIONS

Mattheij, et al, Tailored Fiber Placement-Mechanical Properties and Applications, Journal of Reinforced Plastics and Composites, vol. 17, No. 9, 1998, pp. 774-786.*

* cited by examiner

*Primary Examiner* — Jeff H Aftergut
(74) *Attorney, Agent, or Firm* — Kenyon & Kenyon LLP

(57) ABSTRACT

In a method, multilayer tailored fiber placement (TFP) preforms of any desired thickness may be easily produced without fixing threads or intermediate layers interfering. Reinforcing fibers are sewn onto a substrate using a chemically or thermally meltable fixing thread thus resulting in the formation of a reinforcing fiber structure. The fixing thread firstly serves to fix the reinforcing fibers on the substrate and is subsequently melted so that the fixing thread disintegrates while pre-fixing the reinforcing fibers and may not influence the mechanical properties of the reinforcing fiber structure.

14 Claims, 2 Drawing Sheets

Stand der Technik:

METHOD FOR PRODUCING MULTILAYER TAILORED FIBER PLACEMENT (TFP) PREFORMS USING MELTABLE FIXING FIBERS

FIELD OF THE INVENTION

The present invention relates to a method for producing multilayer tailored fiber placement (TFP) preforms using meltable fixing threads, e.g., for the production of TFP preforms of any desired thickness and without interfering intermediate layers.

BACKGROUND INFORMATION

A conventional method of producing tailored fiber placement (TFP) structures is to sew reinforcing fibers onto a substrate. However, the thickness of an individual TFP structure is limited to approximately 5 mm because sewing additional reinforcing fibers onto the structure already formed damages the fibers previously sewn on. In addition, the sewing threads used previously to fix the reinforcing fibers, as well as the sewing substrate and the under-threads accumulated on the bottom of the substrate material remain in the TFP structure. When multilayer TFP structures made up of more than two individual TFP structures are produced, at least one of these layers containing high amounts of fixing yarn remains within the structure in addition to the fixing threads.

Previously, it was possible to form a preform without an intermediate layer from a maximum of two TFP structures, the two individual TFP structures being joined together in such a way that the substrate and under-thread accumulation are always located on the outside of the formed structure. At the same time, this means that such a preform formed from two individual TFP structures has a maximum thickness of approximately 10 mm. However, in this case also, the sewing threads are still contained in the fiber composite part after impregnation and curing and represent imperfections in the material. The constrictions and displacements of the reinforcing fibers caused by the fixing threads and the usually poor connection of the fixing threads to the matrix material have an adverse effect on the mechanical properties of the material.

A moldable, multiaxial reinforcing structure is described in European Published Patent Application No. 0 567 845, it being possible to position the reinforcing fibers in any direction appropriate to the stress conditions using embroidery technology. The glass transition temperature (or softening point) of the embroidery yarns is in this case above the softening point of the composite material in order to ensure a secure fixing of the reinforcing fibers within the composite until the final molding.

In addition, German Published Patent Application No. 196 28 388 describes a force flux-appropriate, multiaxial, multilayer fiber preform having Z-axis reinforcement at least in some areas and a method of manufacturing same. Z-axis reinforcing fibers are incorporated by embroidery at least in some areas to accommodate the force flux in the Z-axis.

It is an object of the present invention to provide a method making it possible to produce multilayer TFP preforms of any thickness and without interference by fixing threads or intermediate layers in a simple manner.

SUMMARY

This and other objects may be achieved by providing a method having the features described herein. Additional example embodiments of the present invention are also described herein.

A central idea is that reinforcing fibers are sewn onto a substrate using a chemically or thermally meltable fixing thread so that a reinforcing fiber structure is produced, the fixing threads first being used to fix the reinforcing fibers to the substrate and then being melted so that the fixing threads disintegrate, pre-fixing the reinforcing fibers, without influencing the mechanical properties of the reinforcing fiber structure.

The use of such a fixing thread may provide that, for example, the constrictions and displacements in the fibers caused by sewing are released again after the melting so that the fixing thread has no interfering influence on the mechanical properties of the structure. The release of the constrictions and displacements also may result in lower fiber waviness and thus better fiber utilization. Moreover, with partial or complete disintegration of the fiber, no interface is present from which premature cracks may originate.

Additional aspects of the fixing thread used for sewing may arise from the adhesive effect of the melted fixing fiber. This pre-fixes the reinforcing fiber structure so that the reinforcing fiber structure receives adequate stability for further processing. The aspects associated with this may be evident primarily in connection with the second and third embodiments.

According to a first example embodiment, a multilayer TFP preform is produced so that at least two reinforcing fiber structures sewn together by meltable fixing threads are stacked to form a multilayer stack structure. Subsequently the fixing thread is melted so that it disintegrates completely in the stack structure. After the stack structure is impregnated and cured, a multilayer TFP preform without fixing threads is obtained.

The fixing thread may be disintegrated in different ways, depending on the type of thread used. For example, the fixing thread may be melted by a chemical reaction with the resin used for impregnating or curing the multilayer TFP preform. In so doing, the fixing thread is disintegrated chemically in the matrix used for impregnating so that it is no longer present in the finished, cured TFP preform and is thus not able to have an interfering influence on the mechanical properties due to constrictions or displacements. This procedure may be economical and may provide certain advantages, e.g., when a TFP preform is to be produced in as few steps as possible because the disintegration may take place automatically during the impregnation and curing process.

This manner of melting is used not only in the production of multilayer TFP structures having an intermediate layer of a sewn substrate, but also in the production of TFP preforms without intermediate layers, which are made up of either one or two individual reinforcing fiber structures joined like a sandwich, it being possible to peel off their outward facing substrates after the impregnating or curing step.

As an alternative, the fixing thread may be melted by an external heat source. In doing so, the fixing thread is heated to a temperature above its melting point. The melting of the fixing thread by an external heat source may be provided when it is desired to disintegrate the fixing thread even before the impregnation and curing process. As a result, it is possible to make corrections on an already stacked structure before the final impregnation and curing process. Consequently, this type of heating or melting may make more flexible handling possible.

In addition to the use of external heat sources, it is also possible to utilize the heat during the impregnation and curing process. This means that the fixing thread melts due to the heat arising during the impregnation or curing process. In this case also, the melting and impregnating/curing may take place in one step.

According to a second example embodiment, the fixing thread is melted by applying external heat immediately after the reinforcing fibers are sewn onto the substrate. A plurality of such reinforcing fiber structures is then stacked to form a multilayer stack structure, which is then impregnated and cured. In addition to disintegrating the fixing thread, the reinforcing fibers may also be pre-fixed using the adhesive action of the thermally melted fixing thread, which imparts an adequate stability to the reinforcing fiber structure without the formation of snarls. In other words, it is not only possible to melt the fixing thread after stacking several reinforcing structures but instead even before stacking.

In this manner, it is possible to produce not only thick, multilayer TFP preforms having intermediate layers but also TFP preforms without intermediate layers, made up of two reinforcing fiber structures joined like a sandwich, the substrates in each case facing outwards and—similar to a two-layer TFP preform according to the first example embodiment—and being removable by simply tearing them off after the fixing thread is disintegrated.

According to a third example embodiment, a multilayer preform of any thickness without an interfering intermediate layer made of substrate and fixing threads is produced, as in the previous cases, by first sewing reinforcing fibers onto a substrate using a thermally meltable fixing thread so that a reinforcing fiber structure is produced. Next, the fixing thread is heated using an external heat source to a temperature above its melting point. The fixing thread melts, and the reinforcing fibers are pre-fixed due to the adhesive action of the molten fixing thread. This may make it possible for the substrate to be then separated from the thus formed reinforcing fiber structure and the pre-fixed reinforcing fibers have an adequate stability so that they may be stacked to form a multilayer structure. The structure formed may provide that it contains no interfering intermediate layers made up of the substrate and accumulated fixing threads.

The fixing thread used for sewing may include a thermoplastic thread or a hot melt yarn. An example of a hot melt yarn that disintegrates when heated above its melting point is a copolyamide multifilament hot melt yarn (Grilon K85 110 dtex). These threads or yarns may ensure a disintegration and an adequate pre-fixing of the reinforcing fiber structure due to the adhesive action. Furthermore, the use of thermoplastic threads may be provided due to the mechanical properties since brittle resins are normally modified to be impact-resistant by the addition of thermoplastics.

The reinforcing fibers may be situated on the substrate in force flux orientation so that depending on the desired application, the reinforcing fibers are aligned on the substrate in the desired principal direction of stress. Using the idea of the present invention, it is thus also possible to transfer this force flux-appropriate fiber deposition to multilayer TFP preforms of any thickness. In addition, it is possible to arrange a quasi-isotropic structure in an analogous manner.

The present invention will be described in greater detail below on the basis of the appended Figures.

DETAILED DESCRIPTION

Figure 1:
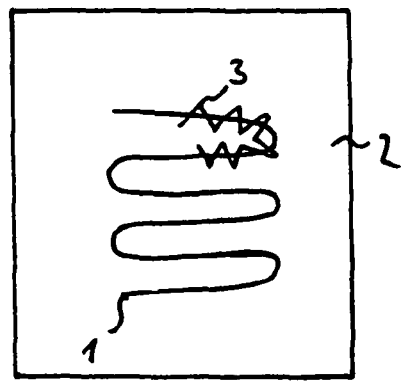
FIG. 1 is a schematic view illustrating the application of reinforcing fibers on a substrate material.

FIG. 1 is a schematic representation to explain the application of a reinforcing fiber 1 on a substrate material 2. Reinforcing fiber 1 is at first placed on substrate 2 in the desired principal direction of stress and then sewn onto substrate 2 using a fixing thread 3. The sewing may be done using conventional methods, reinforcing fibers 1 being attached to sewing substrate 2 using a zigzag stitch. Substrate 2 may be a tear-off fabric or a glass fiber fabric having a surface density $\leq 100$ g/m$^2$ or even another suitable material. Reinforcing fibers 1 are usually rovings of glass and carbon filaments.

FIG. 1 illustrates only a first layer of reinforcing fibers, the reinforcing fibers being arranged unidirectionally. It is possible to sew an additional reinforcing fiber layer onto the structure already formed in the same manner. The orientation of the reinforcing fibers may either correspond with that of the first layer or, depending on the desired application, it may also assume a different angle of orientation with respect to the first reinforcing fiber layer. This means that, depending on the application, the reinforcing fibers may be sewn on unidirectionally in the principal direction of stress or consistent with the desired force flux orientation.

The superposition of reinforcing fibers is, however, limited because when new reinforcing fiber layers are sewn on, the needle guiding the fixing thread passes through the already sewn-on reinforcing fibers, which may result in damage, constriction or displacement of the already sewn fibers. In addition, with increasing thickness of the structure, there is the danger that the needle will damage the fibers in the lower layers when penetrating the already sewn-on fibers. For this reason, the thickness of the layer structure made up of reinforcing fibers is limited to approximately 5 mm.

Figure 2:
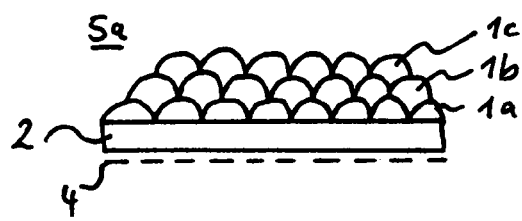
FIG. 2 is a cross-sectional view of the system illustrated in FIG. 1.

FIG. 2 is a schematic cross-sectional view of a structure made up of several superimposed reinforcing fibers. Three reinforcing fiber layers 1a, 1b, 1c, which are sewn onto substrate 2, are indicated. The fixing thread is indicated by a dashed line 4 in FIG. 2 only as an under-thread accumulation on the bottom of substrate material 2. This structure, made up of reinforcing fiber layers 1a, 1b, 1c, substrate 2 and under-thread accumulation 4, is identified in the following as reinforcing fiber structure 5a.

Figure 3A:
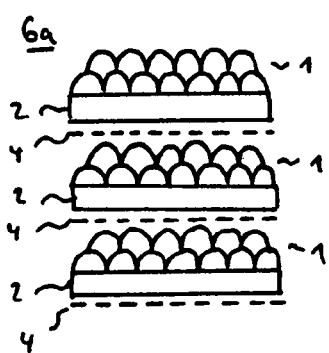
FIGS. 3a to 3c illustrate multilayer TFP preforms having intermediate layers made up of a substrate and an under-thread accumulation according to the related art.
Figure 3B:
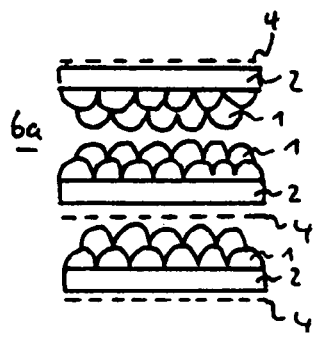
Figure 3C:
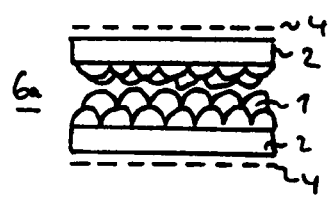

If a TFP preform is to be produced from such a reinforcing fiber structure 5a as illustrated schematically in FIG. 2, this may be done according to the related art in such a manner that either several individual reinforcing fiber structures 5a are superimposed randomly, as suggested schematically in FIGS. 3a and 3b, or two individual reinforcing fiber structures 5a are joined like a sandwich, substrates 2 including accumulated under-threads 4 each facing outwards (see FIG. 3c). Subsequently stack structures 6a formed in this manner are impregnated and cured using a conventional method. However, this means that the conventional TFP preform illustrated in FIGS. 3a and 3b has a layer of substrate material 2 and accumulated under-threads 4 located between the individual reinforcing fiber layers. Moreover, a preform without an intermediate layer according to the related art illustrated in FIG. 3c is limited to a maximum thickness of approximately 10 mm. In addition, the fixing threads are contained in the structures, which due to the constrictions and displacements resulting from the sewing process, may have an adverse influence on the mechanical properties of the structure.

Instead of the customary yarn materials for fixing reinforcing fibers 1 on substrate 2, a meltable fixing thread is used according to an example embodiment of the present invention. The fixing fiber may provide that it either reacts chemically with the substance used for impregnation (typically a resin system) or is completely disintegrated by the application of external heat. This results in adequate fixation on the substrate when sewing on, since in this case the thread is used for the customary fixation and also the fixing thread disintegrates so that constrictions caused by sewing are released again and the fixing thread exerts no interfering influence on the mechanical properties of the finished, i.e., impregnated and cured TFP preform.

In addition to using the chemically disintegrating thread to produce a single-layer TFP preform, it is also used to produce a TFP preform made up of two or more reinforcing fiber structures (see FIGS. 3a-3c). Reinforcing fibers 1 are sewn onto a substrate 2 using the fixing thread so that reinforcing fiber structure 5a illustrated in FIG. 2 is produced. In the next step, for example, it is possible to join two reinforcing fiber structures 5a according to the system in FIG. 3c like a sandwich in such a manner that each of substrates 2 faces outwardly. The two-layer sandwich structure formed in this manner is then impregnated and cured using a resin system. Because of the chemically disintegrated fixing thread, the finished TFP preform contains no fixing threads 3 or under-threads 4 after the impregnation and curing process, so that it is possible to remove substrates 2 by simple tearing off or peeling.

For applications in which intermediate layers made up of substrates do not interfere, a plurality of reinforcing fiber structures 5a may be stacked in any manner to a desired thickness, as illustrated, for example, in FIGS. 3a and 3b. As in the case described above, the structure formed is then impregnated and cured while the fixing thread is chemically disintegrated.

Instead of a chemically meltable fixing thread, a thermally meltable fixing thread having a low melting point may also be used to sew on the reinforcing fibers. A fixing thread of this type is, for example, the hot melt yarn Grilon K85 110 dtx from EMS Chemie, which has a melting point of approximately 85° C. It might also be noted that the melting point of the aforementioned fixing yarn meltable by chemical reaction is significantly higher. The TFP preforms described above may also be produced using a thermally meltable fixing thread. In this case, the fixing thread is melted by heat, which is described in greater detail below.

Figure 4:
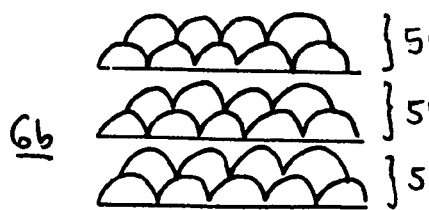
FIG. 4 is a schematic representation of the multilayer structure according to an example embodiment of the present invention of a TFP preform of any thickness without intermediate layers.

Moreover, intermediate substrate layers are undesirable or interfering for many applications so that they may be removed in a suitable manner. To this end, reinforcing fibers 1 are sewn onto substrate 2 using a thermally meltable fixing thread having a low melting point. Using a meltable fixing thread of this type may ensure an adequate fixation of fibers 1 on substrate 2 and the disintegration of thread 3 by the application of heat and its adhesability result in an adequate stability or strength of the reinforcing fiber layers, so that substrate 2 may be easily torn off from reinforcing fibers 1 without adversely affecting the layer structure of the reinforcing fibers. The result is a reinforcing fiber structure without a substrate as denoted by reference numeral 5b in FIG. 4. In addition, a stack structure 6b is illustrated in FIG. 4, which is made up of a plurality of reinforcing fiber structures without substrate 5b. After impregnation and curing, a multilayer TFP preform of any thickness and without intermediate layers is thus obtained in a simple manner.

Depending on the application or as a function of the desired structure, the heat required to disintegrate or melt the fixing thread may be applied in various manners. For example, the fixing thread may be melted by applying heat during the impregnating or curing process. Reinforcing fibers 1 sewn onto substrate 2 using fixing thread 3 are impregnated using, for example, a heat-curing resin system (e.g., Hexcel RTM6, infiltration temperature approximately 120° C.; curing temperature approximately 160° to 180° C.) and subsequently cured. Due to the high temperature during the impregnating or curing phase, the fixing thread melts and disintegrates in the resin. Since the fixing threads disappear in this manner, the substrate may be easily separated from the laminate after curing by tearing off. In addition the constrictions and displacements in the fiber caused by the sewing process are released again. This therefore may result in a laminate that is made up exclusively of reinforcing fibers and matrix (resin with disintegrated threads).

It is possible to utilize the application of heat for the melting of the fixing thread during the impregnating or curing process if a TFP preform is to be formed that is made up of only one or a maximum of two of the TFP structures illustrated in FIG. 2. In this case, an additional, separate heating step may be eliminated since the disintegration of the fixing thread and the impregnation or curing are tied together, resulting in savings.

For the production of multilayer TFP preforms of any desired thickness without intermediate layers, the heating is performed in a separate step preceding the impregnation or curing of the reinforcing fibers. To this end, the structure illustrated in FIG. 2 is heated under pressure to a temperature above the melting point of the fixing fiber. This may be done, for example, using a heatable press, an external heating device or other suitable device(s) or means to heat the structure. In addition or instead, controlled amounts of heat may also be applied to reinforcing fiber structure 5a from the back, so that the sewing thread on the bottom begins to melt and substrate 2 is released. The fixing thread is thus fused and after cooling fixes the reinforcing fibers by its adhesive action and no longer due to the snarling of threads produced in the sewing process. At the same time, the melting of the fixing fibers causes the constrictions and displacements of the reinforcing fibers produced by the sewing process to be released again, which results in lower fiber waviness and better fiber utilization. The tear-off fabric may now be easily detached from this pre-fixed fiber structure without the reinforcing fibers changing their position. In this manner, a pre-fixed structure of reinforcing fibers 5b is created, which contains no fixing fibers and overall has adequate strength and stability for further processing into TFP preforms (see FIG. 4).

In the next processing step, reinforcing fibers 5b produced in this manner are stacked on one another and then impregnated and cured using a conventional method to form the finished TFP component. A laminate is produced, which is exclusively made up of reinforcing fibers and has no constrictions or displacements of the reinforcing fibers due to the sewn fixing thread. A stacked layer structure of this type made up of reinforcing fibers without intermediate layers is schematically illustrated in FIG. 4.

EXAMPLES

Figure 5:
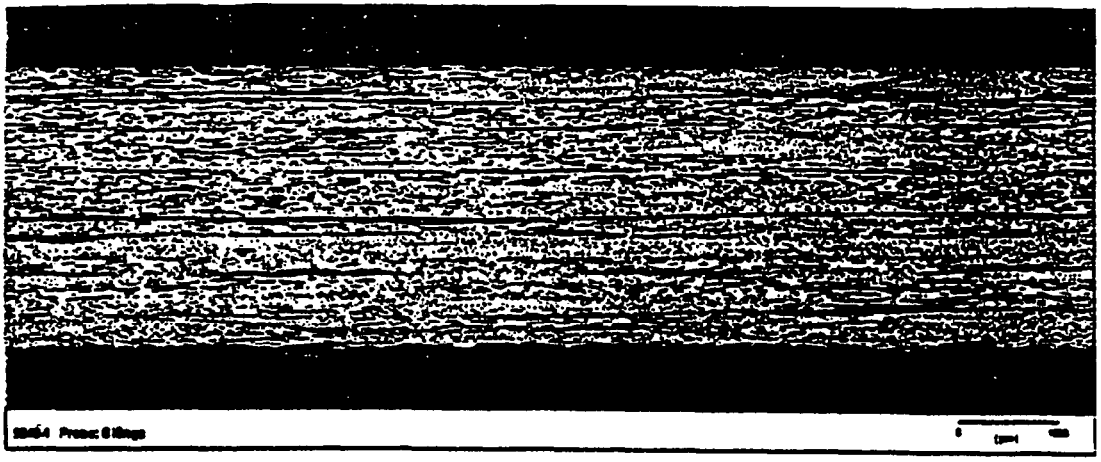
FIGS. 5 and 6 are cross-sectional views of a sample taken from a TFP preform produced according to the present invention, shown on different scales.

Unidirectional TFP preforms including different yarns for fixing carbon fiber rovings (Tenax HTS 5331-24K) were produced on the substrate material (glass fiber screen fabric 80 g/m²) are produced on a CNC sewing system. The yarns used as sewing threads were a meltable copolyamide multifilament hot melt yarn (Grilon K85 110 dtex), which typically has a melting point of 85° C., and a polyamide monofilament yarn (Transfil 56 dtex), a polyamide multifilament twisted yarn (Serafil 100 dtex), and a polyester multifilament yarn, which is customarily used for the production of multiaxial fabrics (textured PSE 76 dtex). In contrast to the yarns mentioned first, the yarns mentioned last do not melt at the temperatures occurring in further processing. As an additional variant, the reinforcing fibers were sewn onto the tear-off fabric "Super Release Blue" using Grilon K85 110 dtex. The carbon fiber rovings were placed parallel to each other spaced at 3.375 mm and fixed to the substrate using a zigzag stitch with a 4 mm overstitch and a stitch width of 2 mm, a total of 4 unidirectional layers one on top of the other. Two of these reinforcing fiber structures or TFP semifinished products were then superimposed outward with the substrate material and impregnated and cured with Hexcel RTM6 using the membrane-supported RI method. Samples were collected from the laminate plates in the direction of the fibers and subjected to stress until failure in the tensile test and compression test. FIG. 5 illustrates a section from such a sample in which the reinforcing fibers were sewn onto the tear-off fabric Tenax HTS 5331-24K using the fixing yarn Grilon K85.

Figure 6:
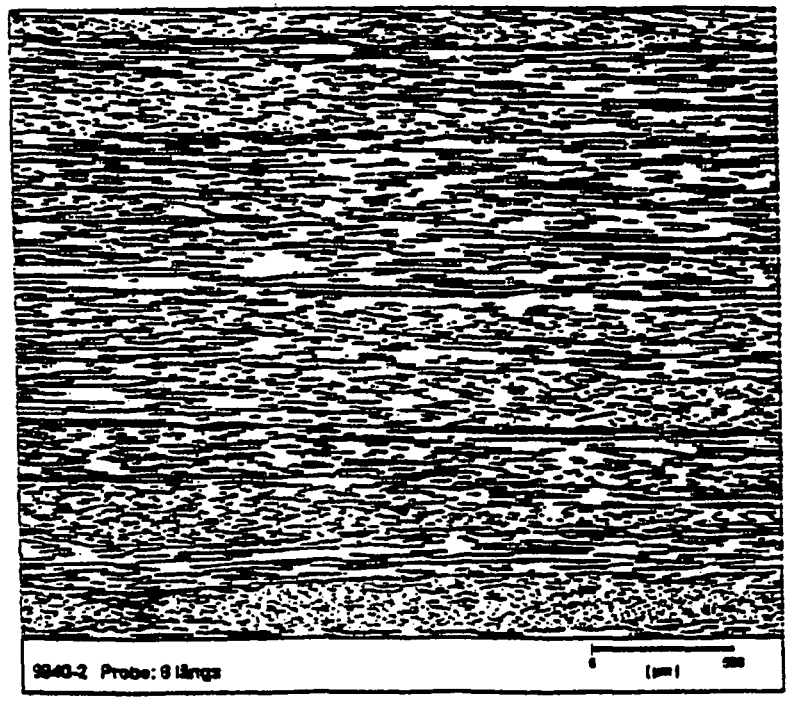

The carbon fiber content by volume actually reached in the laminate plates varied strongly despite identical production conditions—all laminates were produced together in one autoclave cycle using the same quantity of resin in each case. The lowest values were reached with Transfil and Serafil (approximately 50-52%). Significantly higher values of approximately 58-60% were reached with the textured polyester yarn. The cause for this may be the essentially higher elasticity and flexibility due to the texturing (crimping), which results in a more uniform fiber distribution or reduction in areas high in resin. A further increase in the fiber content by volume (approximately 62%) is reached with the hot melt yarn, which releases the carbon fiber rovings at the time of infiltration and actually passes over into the matrix. Removing the substrate material increases the value to approximately 65 to 67% in the example embodiment illustrated in FIG. 5 or 6. The comparison of the tensile strengths of the different samples shows that a significant increase is attained by using Grilon. This resulted in a 10 to 30% improvement compared to the three standard yarns. The compressive strengths of the Grilon samples are average. The best value is obtained with Serafil. In contrast, the Grilon samples have a rather below average stiffness. In summary, compared to the most favorable value using standard yarns, the tensile strength is increased by 30%, the compressive strength by 23%, the tensile modulus by 8% and the compression modulus by 26%.

What is claimed is:

1. A method for producing a multilayer TFP (Tailored Fiber Placement) preform, comprising:
   sewing reinforcing fibers onto a substrate with one of a chemically- and a thermally-meltable fixing thread to fix the reinforcing fibers to the substrate to produce a reinforcing fiber structure; and
   then melting the fixing thread so that the fixing thread dissolves to adhesively pre-fix the reinforcing fibers to the substrate, mechanical properties of the reinforcing fiber structure being unaffected by the fixing thread;
   wherein, after the melting step, the pre-fixed reinforcing fibers are removable from the substrate as a reinforcing fiber structure.

2. The method according to claim 1, further comprising:
   stacking at least two reinforcing fiber structures to form a multilayer stack structure;
   melting the fixing thread; and
   impregnating and curing the stack structure.

3. The method according to claim 2, wherein the fixing thread melting step is performed during the impregnating and curing step by chemical reaction with a material to be impregnated.

4. The method according to claim 2, wherein the melting step includes applying external heat to heat the fixing thread to a temperature above a melting point.

5. The method according to claim 4, wherein the external heat is applied in the external heat applying step during the impregnating and curing step to melt the fixing thread.

6. The method according to claim 2, further comprising removing an outwardly facing substrate of the stack structure by one of tearing off and peeling.

7. The method according to claim 1, further comprising:
   melting the fixing thread by applying external heat after sewing the reinforcing fibers onto the substrate to pre-fix the reinforcing fibers by adhesive action of a molten fixing thread and to provide adequate stability to the reinforcing fiber structure;
   stacking a plurality of reinforcing fiber structures to form a stack structure; and
   impregnating and curing the stack structure.

8. The method according to claim 7, further comprising removing an outwardly facing substrate of the stack structure by one of tearing off and peeling.

9. The method according to claim 1, wherein the fixing thread includes one of a thermoplastic and a hot melt yarn.

10. The method according to claim 9, wherein the fixing thread includes a copolyamide multifilament hot melt yarn.

11. The method according to claim 1, wherein the preform lacks an intermediate layer, the method further comprising:
    melting the fixing thread by applying external heat after sewing the reinforcing fibers onto the substrate to pre-fix the reinforcing fibers by adhesive action of a molten fixing thread and to provide adequate stability to the reinforcing fiber structure;
    stacking a plurality of reinforcing fiber structures without a substrate to form a stack structure; and
    impregnating and curing the stack structure.

12. The method according to claim 1, further comprising one of force-flux orienting and arranging quasiisotropically the reinforcing fibers on the substrate.

13. The method according to claim 1, further comprising tearing off the reinforcing fibers as a reinforcing fiber structure from the substrate after the melting step.

14. The method according to claim 1, wherein the method is adapted to produce a multilayer TFP preform having a selectively desired thickness and without an interfering intermediate layer.

* * * * *